United States Patent
Pfeiffer et al.

(10) Patent No.: US 7,571,047 B2
(45) Date of Patent: Aug. 4, 2009

(54) DETECTION OF VALVE DEACTIVATION FAILURE BY MONITORING EXHAUST TEMPERATURE

(75) Inventors: Jeffrey M. Pfeiffer, Frankenmuth, MI (US); Jon C. Darrow, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 183 days.

(21) Appl. No.: 11/888,744

(22) Filed: Aug. 2, 2007

(65) Prior Publication Data

US 2009/0037042 A1 Feb. 5, 2009

(51) Int. Cl.
*G06F 19/00* (2006.01)
*F01L 1/34* (2006.01)
*G06F 11/30* (2006.01)
*G01M 13/02* (2006.01)

(52) U.S. Cl. .................... 701/114; 701/103; 123/90.15; 702/183; 73/114.79

(58) Field of Classification Search ... 123/90.15–90.18, 123/568.14, 568.16, 198 F; 701/101–103, 701/112, 114, 115; 702/130, 182, 183; 73/114.79
See application file for complete search history.

(56) References Cited

U.S. PATENT DOCUMENTS

| | | | |
|---|---|---|---|
| 6,257,184 B1 * | 7/2001 | Yamagishi et al. | 123/90.15 |
| 6,885,976 B2 * | 4/2005 | Yoshiki et al. | 702/185 |
| 7,066,160 B2 * | 6/2006 | Matsumoto | 123/90.15 |

FOREIGN PATENT DOCUMENTS

JP 2001152883 A * 6/2001 ............... 123/90.15

* cited by examiner

*Primary Examiner*—Willis R Wolfe, Jr.
(74) *Attorney, Agent, or Firm*—Paul L. Marshall

(57) ABSTRACT

An internal combustion engine having valve deactivation capability for at least one cylinder, or for an entire bank of cylinders in a multiple-bank engine, is provided with a temperature probe in the exhaust stream of that cylinder or cylinder bank. The temperature probe is connected to an Engine Control Module programmed to determine the rate of temperature change during valve deactivation, to compare the determined value to an acceptable range of rates, and to signal, when the rate exceeds an acceptable range. When the valves of a cylinder are properly deactivated, the temperature in the exhaust pipe decreases slowly. However, when valve deactivation fails, the cylinders pump non-combusted air from the intake manifold into the exhaust manifold, resulting in a relatively rapid decrease in exhaust temperature. This abnormal rate of temperature decrease thus can be used as an indicator of failure of the VVA system.

7 Claims, 1 Drawing Sheet

DETECTION OF VALVE DEACTIVATION FAILURE BY MONITORING EXHAUST TEMPERATURE

TECHNICAL FIELD

The present invention relates to internal combustion engines; more particularly, to devices for selectively deactivating valves in a bank of cylinders of a V-style or opposed-style engine; and most particularly, to method and apparatus for detecting failure of such a device.

BACKGROUND OF THE INVENTION

Apparatus and methods for selectively deactivating one or more combustion valves in an internal combustion engine are well known. Such devices, known in the art as variable valve deactivation or activation (VVA) devices, may take the form of, for example, a selectively latchable rocker arm, a roller finger follower, a rocker arm support member such as a hydraulic lash adjuster, or a hydraulic lifter. VVA is also known in the art as "cylinder deactivation" because the effect of deactivating either or both of the intake and exhaust valves of a cylinder is to remove that cylinder as a driving element of the engine. Such deactivation can improve the fuel efficiency of a multiple-cylinder engine under load conditions wherein the power capacity of the entire engine is not needed.

Valve deactivation may be applied to as few as one cylinder; however, as commonly practiced in the automotive arts, an entire bank of cylinders in a multiple-bank engine is deactivated as a unit. For example, in a V-6 engine, an entire bank of three cylinders may be deactivated, permitting the engine to continue to run on the other three-cylinder bank as a three-cylinder engine until the full engine capacity is again required.

When the intake and exhaust valve trains of a bank are both deactivated, the fuel injectors and spark ignitors (for spark-ignited engines) are also deactivated. Each piston in the deactivated bank continues to compress and expand a captive air supply in lost motion, but there is no net work performed and no flow of air or fuel through the cylinder.

It is known that deactivation mechanisms can fail, resulting in the valves' continuing to open and close. Such failure results in a significant reduction in fuel economy and in loss of thermal and compositional control of the exhaust stream, which can have serious adverse consequences on functions such as exhaust gas recirculation (EGR) and emissions control. Therefore, it is important to detect immediately when a valve deactivation mechanism fails.

What is needed in the art is a method and apparatus for detecting failure of a valve deactivation mechanism.

It is a principal object of the present invention to detect and alarm as soon as possible any failure of a valve deactivation mechanism in an internal combustion engine.

SUMMARY OF THE INVENTION

Briefly described, an internal combustion engine having deactivation capability for at least one cylinder is provided with a temperature probe in the exhaust stream of that cylinder. For a bank-deactivating engine, only a single temperature probe is required for the exhaust manifold for the deactivatable bank. The temperature probe is connected to an Engine Control Module (ECM) that is programmed to interrogate the temperature probe during valve deactivation, to determine the rate of temperature change during deactivation, to compare the determined value to an acceptable range of rates, and to signal when the determined rate exceeds the acceptable range.

When the valves of a cylinder are properly deactivated, gas flow in the corresponding exhaust pipe is stagnant, and therefore the temperature in the exhaust pipe decreases slowly as the gas is-not replaced by fresh, hot exhaust. However, when valve deactivation fails and the exhaust and intake valves continue to open and close on their normal cycles, the cylinder pumps non-combusted air from the intake manifold into the exhaust pipe, resulting in a relatively rapid temperature decrease in the exhaust pipe. This abnormal rate of temperature decrease thus can be used as an indicator of failure of the VVA mechanism.

BRIEF DESCRIPTION OF THE DRAWINGS

The present invention will now be described, by way of example, with reference to the accompanying drawing, wherein.

DESCRIPTION OF THE PREFERRED EMBODIMENTS

Figure 1:
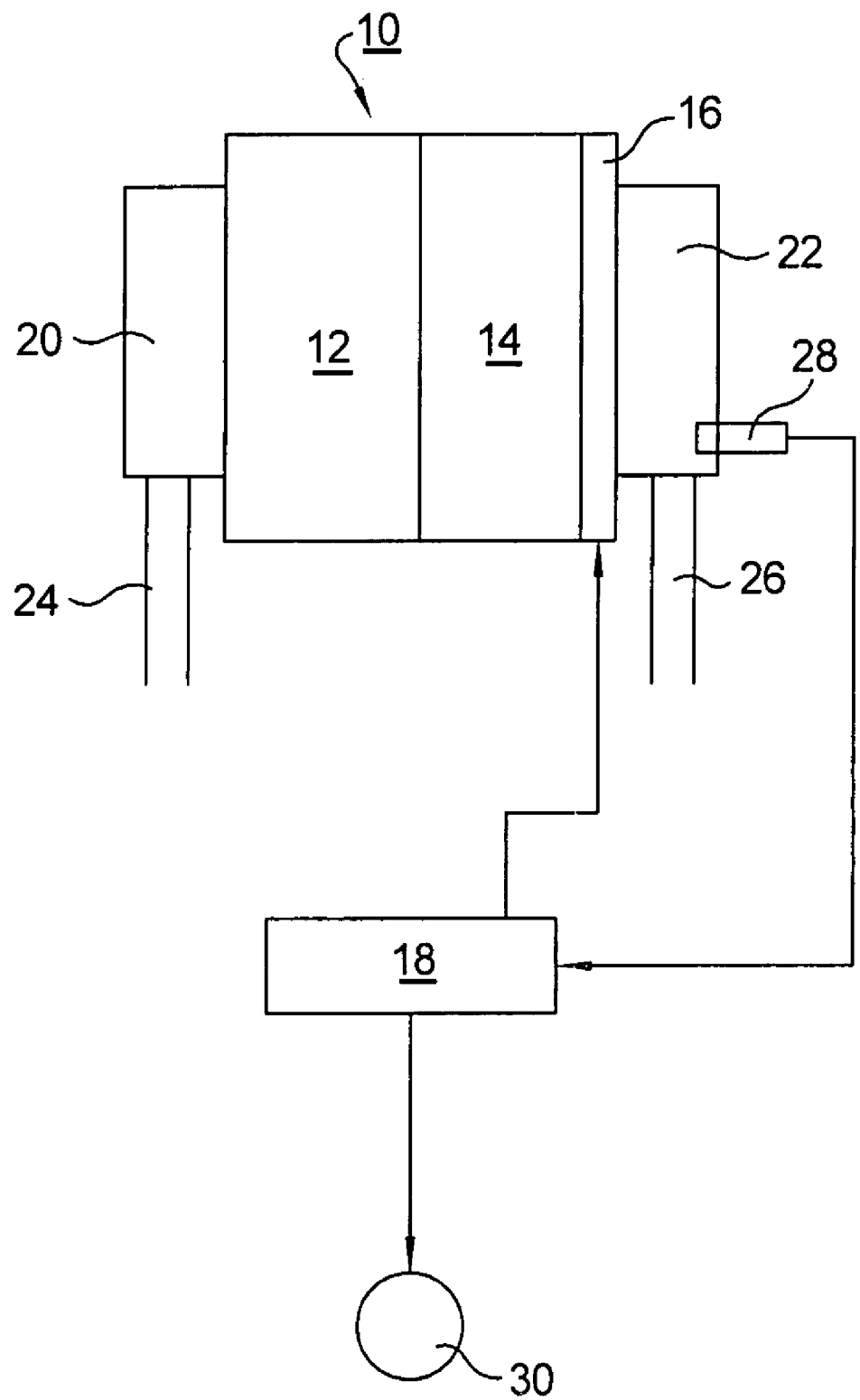
FIG. 1 is a schematic drawing of a two-bank internal combustion engine provided with apparatus for determining valve deactivation failure in accordance with the invention.

Referring to FIG. 1, a two-bank internal combustion engine 10, such as a V-6 or V-8 or opposed style engine, comprises first and second cylinder banks 12,14 wherein second bank 14 is provided with a valve deactivation mechanism 16 selectively controllable by an ECM 18. Each cylinder bank 12,14 includes a respective exhaust manifold 20,22 for conducting exhaust gases from the cylinder bank to an exhaust tailpipe 24,26. A temperature sensor 28 is mounted in a wall of exhaust manifold 22 and preferably extends into the stream of exhaust gas flowing through manifold 22 to send signals representing the temperature of the exhaust gas to ECM 18.

ECM 18 is programmed with an acceptable range of values of the rate equation:

$$dT_{ex} = [T_{exh}(t) - T_{exh}(t+1)]/\Delta t \quad \text{(Eq. 1)}$$

where $dT_{ex}$ is the rate of change of the exhaust gas temperature, $T_{exh}(t)$ is the temperature at time 0, $T_{exh}(t+1)]$ is the temperature at a later time, and $\Delta t$ is the time interval or execution rate and is chosen to allow for ease of distinguishing the exhaust temperature change rates for different cases.

In laboratory trials with a V-6 engine, for example, wherein the valves of the left bank (LB) are always active and the right bank (RB) is equipped for valve deactivation, the following rates have been observed:

When the hot engine is shut off, LB=−1.95, RB=−1.7; i.e., the exhaust cooling rates are essentially the same.

With the engine running, when the right bank is deactivated and the valves remain closed as intended, LB=+0.5, RB=−2.1.

With the engine running, when the right bank is deactivated (fueling and ignition terminated) but the valves continue to function normally, LB=+0.3, RB=−6.3.

Thus in this example it is seen that when the valve deactivation mechanism fails, the rate of cooling in the exhaust manifold of the deactivated valves is about triple the cooling rate when valve deactivation is operating normally.

In a given engine, the measured rate of change of the exhaust temperature is compared to the rate expected for that engine under various deactivation conditions of engine speed and load and is programmed into the ECM. If the observed rate of change is greater than the expected rate by a calibratable threshold, the ECM counts that rate as a failure. Each detected failure is counted as one failure of the VVA system. After a predetermined number of such failures have been detected, which number may be as few as one, the ECM alarms the failure condition, for example, by illuminating a "MIL" or "Check Engine" light 30 on a vehicle dashboard.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An internal combustion engine, comprising:
   a system for determining failure of a variable valve deactivation mechanism disposed in a valve train of a combustion cylinder of the engine,
   wherein said system includes a temperature sensor disposed in the exhaust gas of said combustion cylinder and
   a controller in communication with said temperature sensing means, and
   wherein said controller means is programmed to determine a rate of temperature change in said exhaust gas after said valve train is deactivated by said variable valve deactivation mechanism, to compare said rate of temperature change to a programmed range of acceptable rates of temperature change, and to report when said determined rate of change falls outside of said range of acceptable rates, indicative of failure of said variable valve deactivation mechanism.

2. A method for determining failure of a variable valve deactivation mechanism disposed in a valve train of a combustion cylinder in an internal combustion engine, comprising the steps of:
   a) determining a rate of temperature change in exhaust gas of said cylinder after said valve train is deactivated by said variable valve deactivation mechanism;
   b) comparing said rate of temperature change to a programmed range of acceptable rates of temperature change; and
   c) reporting when said determined rate of change falls outside of said range of acceptable rates, indicative of failure of said variable valve deactivation mechanism.

3. A method in accordance with claim 2 wherein said cylinder is one of a plurality of cylinders comprising a cylinder bank in a multi-bank engine served by a common variable valve deactivation system, and wherein said plurality of cylinders are drained by a bank exhaust manifold, and wherein said exhaust gas is disposed in said bank exhaust manifold.

4. A system for determining failure of a variable valve deactivation mechanism disposed in a valve train of a combustion cylinder in an internal combustion engine, comprising:
   a) temperature sensor disposed in the exhaust gas of said combustion cylinder; and
   b) a controller in communication with said temperature sensing means,
   wherein said controller means is programmed to determine a rate of temperature change in said exhaust gas after said valve train is deactivated by said variable valve deactivation system; to compare said rate of temperature change to a programmed range of acceptable rates of temperature change; and to report when said determined rate of change falls outside of said range of acceptable rates, indicative of failure of said variable valve deactivation mechanism.

5. A system in accordance with claim 4 wherein said temperature sensor is a temperature probe mounted in a wall of an exhaust pipe for said cylinder and extending into an exhaust gas stream from said cylinder.

6. A system in accordance with claim 4 wherein said cylinder is one of a plurality of cylinders comprising a cylinder bank in a multi-bank engine and served by a common variable valve deactivation system, and wherein said plurality of cylinders are drained by a bank exhaust manifold, and wherein said temperature sensor is disposed in said bank exhaust manifold.

7. A system in accordance with claim 4 wherein said controller is an Engine Control Module.

\* \* \* \* \*